UNITED STATES PATENT OFFICE.

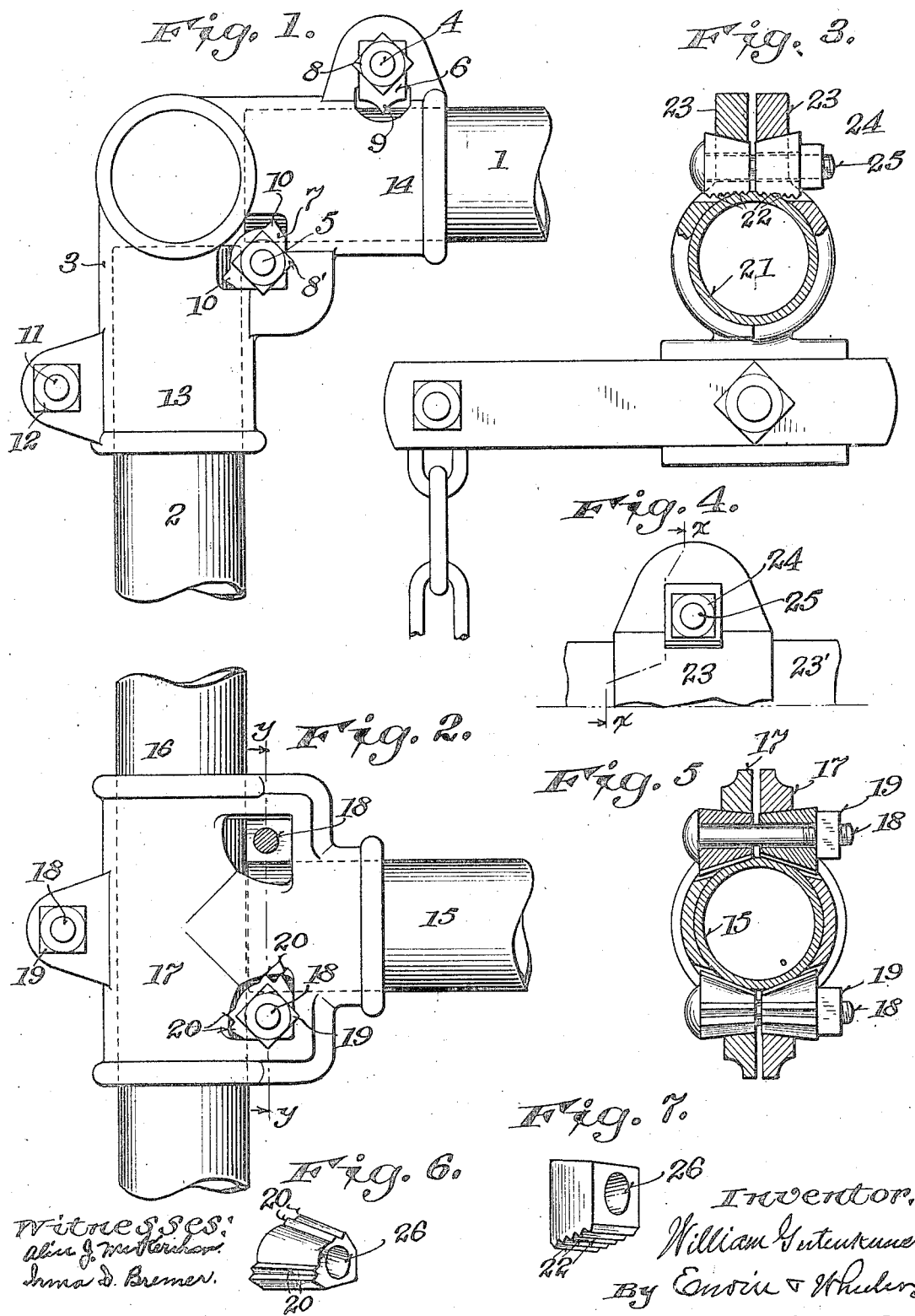
W. GUTENKUNST.
JOINT LOCK.
APPLICATION FILED MAR. 22, 1915.
1,205,733. Patented Nov. 21, 1916.

WILLIAM GUTENKUNST, OF MILWAUKEE, WISCONSIN.

JOINT-LOCK.

1,205,733. Specification of Letters Patent. Patented Nov. 21, 1916.

Application filed March 22, 1915. Serial No. 16,025.

*To all whom it may concern:*

Be it known that I, WILLIAM GUTENKUNST, a citizen of the United States, residing at the city of Milwaukee, county of Milwaukee, and State of Wisconsin, have invented new and useful Improvements in Joint-Locks, of which the following is a specification.

It is a well known fact that when one cylindrical member is secured in the ordinary way to a sleeve of another cylindrical member said members are liable to turn one upon or within the other.

It is therefore the object of my invention to provide a device for rigidly locking one cylindrical member to another, whereby either of said members are prevented from turning.

My invention is further explained by reference to the accompanying drawings, in which—

Figure 1 represents a side view of a device for connecting the ends of a vertical to a horizontal cylindrical member located at right angles to each other. Fig. 2 represents a similar view of a device for connecting a horizontal member to the side of a vertical cylindrical member, also located at right angles to each other. Fig. 3 is a section drawn on line x, x of Fig. 4. Fig. 4 is a side view of the device shown in Fig. 3. Fig. 5 is a section drawn on line y, y of Fig. 2. Figs. 6 and 7 are perspective views of two forms of locking members removed from the cylindrical members and couplings with which they are adapted to be connected.

Like parts are identified by the same reference numerals throughout the several views.

1 is a horizontal cylindrical member and 2 is a vertical cylindrical member.

The members 1 and 2 are connected together by the L-shaped member 3, as shown in Fig. 1, and said L-shaped member 3 is adapted to be clamped around the members 1 and 2 by the clamping bolts 4 and 5, locking blocks 6 and 7 and nuts 8 and 8'. The block 6 is provided with one V-shaped barb 9 which as the nut 8 is turned down on the bolt 4 is caused to penetrate the surface of the cylindrical member 1, while the block 7 is provided with two V-shaped points or barbs 10, 10 which as the nut 8' is turned down on the bolt 5 are caused to penetrate both cylindrical members 1 and 2, whereby said cylindrical members 1 and 2 and coupling 3 are rigidly locked together. The sleeve or coupling 3 is preferably cast with one or both sides open and the same is adapted to be drawn together around the cylindrical members 1 and 2 by turning down the nuts 8, 8' and 12 on the bolts 4, 5 and 11, whereby such cylindrical members are rigidly clamped in the thimbles 13 and 14 of said sleeves or clamping members.

The other figures represent the manner of applying the locking blocks to various forms of cylindrical members and couplings. For example Fig. 2 represents a horizontal cylindrical member 15 rigidly connected to the vertical member 16 by coupling members 17 and said coupling members 17 are clamped to said cylindrical member by a plurality of bolts 18 and nuts 19, and I wish it to be understood that the locking members may be provided with a single barb 9 or 10 to penetrate the cylindrical members, as shown in Fig. 1 or said locking blocks may be provided with a plurality of barbs 20, 20, as shown in Fig. 2, and Fig. 6, or with a still greater number of barbs 22, as shown in Figs. 3, and 7.

In Figs. 3 and 4 the clamping plates 23, 23 when formed of two separate pieces are adapted to be clamped upon two opposite sides of the cylindrical member 21 of such figures by turning down the nuts 24 upon the bolts 25, and when said nuts are thus turned down said clamping blocks are forced toward each other and their V-shaped edges are thereby caused to penetrate the cylindrical member 21 with which they are connected, whereby the cylindrical member is prevented from turning within or being withdrawn from its coupling or sleeve or said coupling or sleeve is prevented from turning upon said cylindrical member. The several coupling blocks are each provided with apertures 26 for the reception of the bolts employed as herein stated, for clamping the several couplings to the cylindrical members.

Heretofore it has been common when coupling pipes or cylindrical members together, as shown in Figs. 1 and 2, to provide the coupling sleeve or elbow, indicated by 3 in Fig. 1, with threads, whereby the members 1 and 2 or 15 and 16 are prevented from being withdrawn from each other and said coupling or L. By my improvement, however, all threads formed in said members 1 and 2 and 15 and 16 and said coupling members 3 are dispensed with, and said cylindrical members 1 and 2 or 15 and 16 are retained in place in said coupling member by contact with the tapered locking blocks 6 and 7 as the nuts are turned down on their respective bolts 5 and 18, shown in Figs. 1 and 2. The tapered locking blocks, shown in Fig. 1, are preferably provided with a plurality of V shaped projections 20, as shown in said Fig. 6, said V shaped projections being referred to by the reference numeral 10 in Fig. 1.

Having thus described my invention what I claim as new and desire to secure by Letters Patent, is:—

1. In a device of the described class, the combination of a cylindrical member, a cylindrical sleeve constructed in two halves inclosing said cylindrical member, an aperture formed in said sleeve, a plurality of pairs of tapered locking blocks, each block being provided with an aperture, a plurality of barbs formed on the exterior surface of said blocks, a bolt provided with a screw thread located in the apertures of said locking blocks, a threaded nut operating on the thread of said bolt, said nut being adapted as it is turned down on said bolt to draw the blocks of each pair toward each other, and force said barbs into said cylindrical members, whereby said cylindrical members are rigidly locked together.

2. In a device of the described class, the combination of a plurality of cylindrical members, a cylindrical sleeve constructed in two halves inclosing the contiguous ends of said members, a plurality of apertures formed in said sleeve, a plurality of pairs of locking blocks each block provided with an aperture, a bolt provided with a screw thread located in the aperture of said locking blocks, a nut operating on the thread of said bolt, said bolt being adapted as said nut is turned down thereon to force said locking blocks into impinging contact with said cylindrical members, whereby said members and sleeve are rigidly locked together.

In testimony whereof I affix my signature in the presence of two witnesses.

WILLIAM GUTENKUNST.

Witnesses:
ALICE J. MCKERIHAN,
IRMA D. BREMER.